Oct. 24, 1967  J. E. PICCARDO  3,348,804
VALVE CONSTRUCTION
Filed June 10, 1964  6 Sheets-Sheet 1

INVENTOR.
JACK E. PICCARDO
BY Edward B Gregg
ATTORNEY

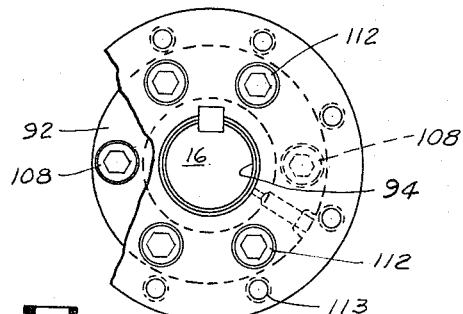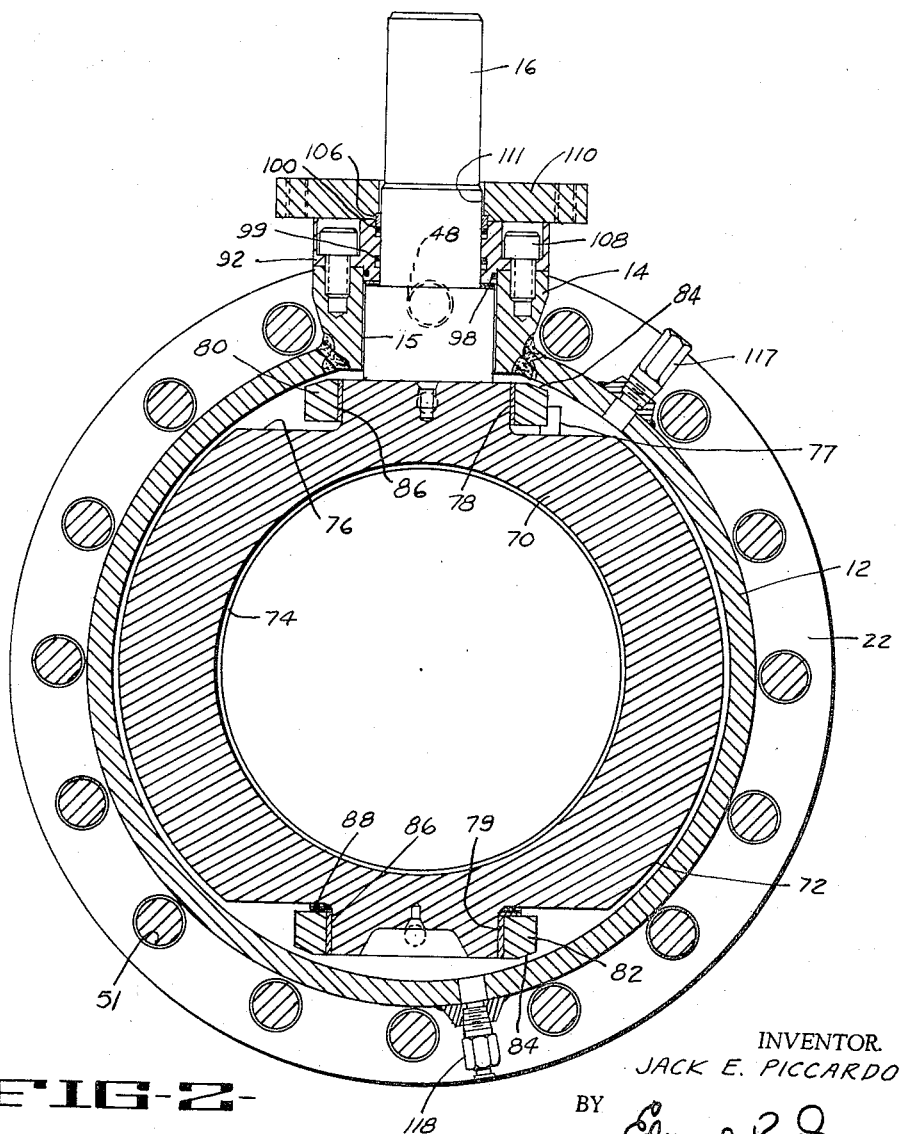

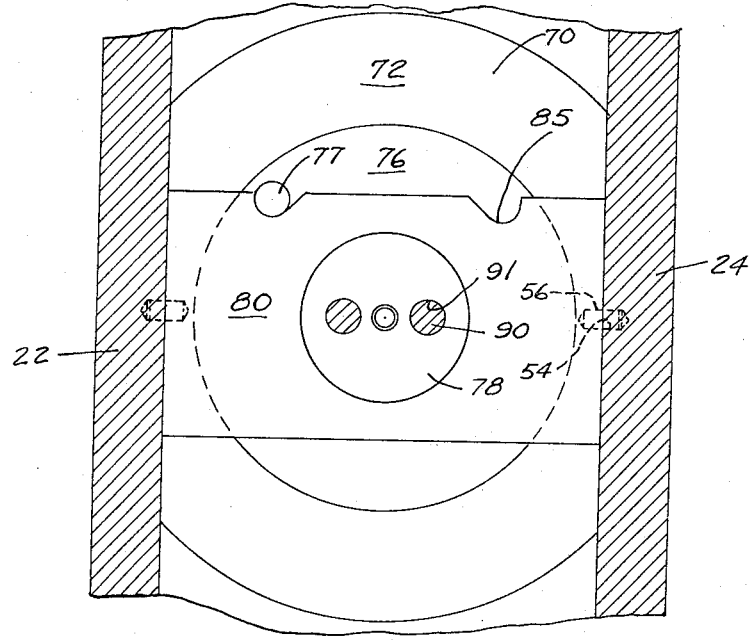
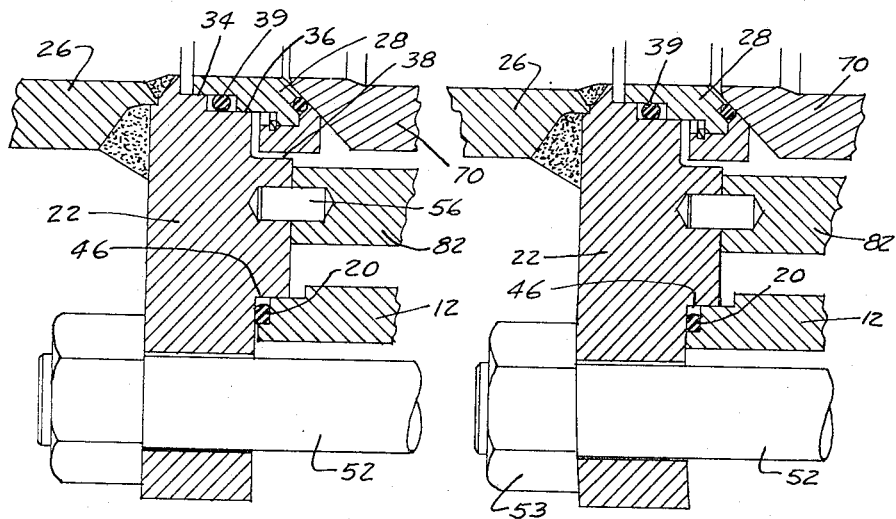

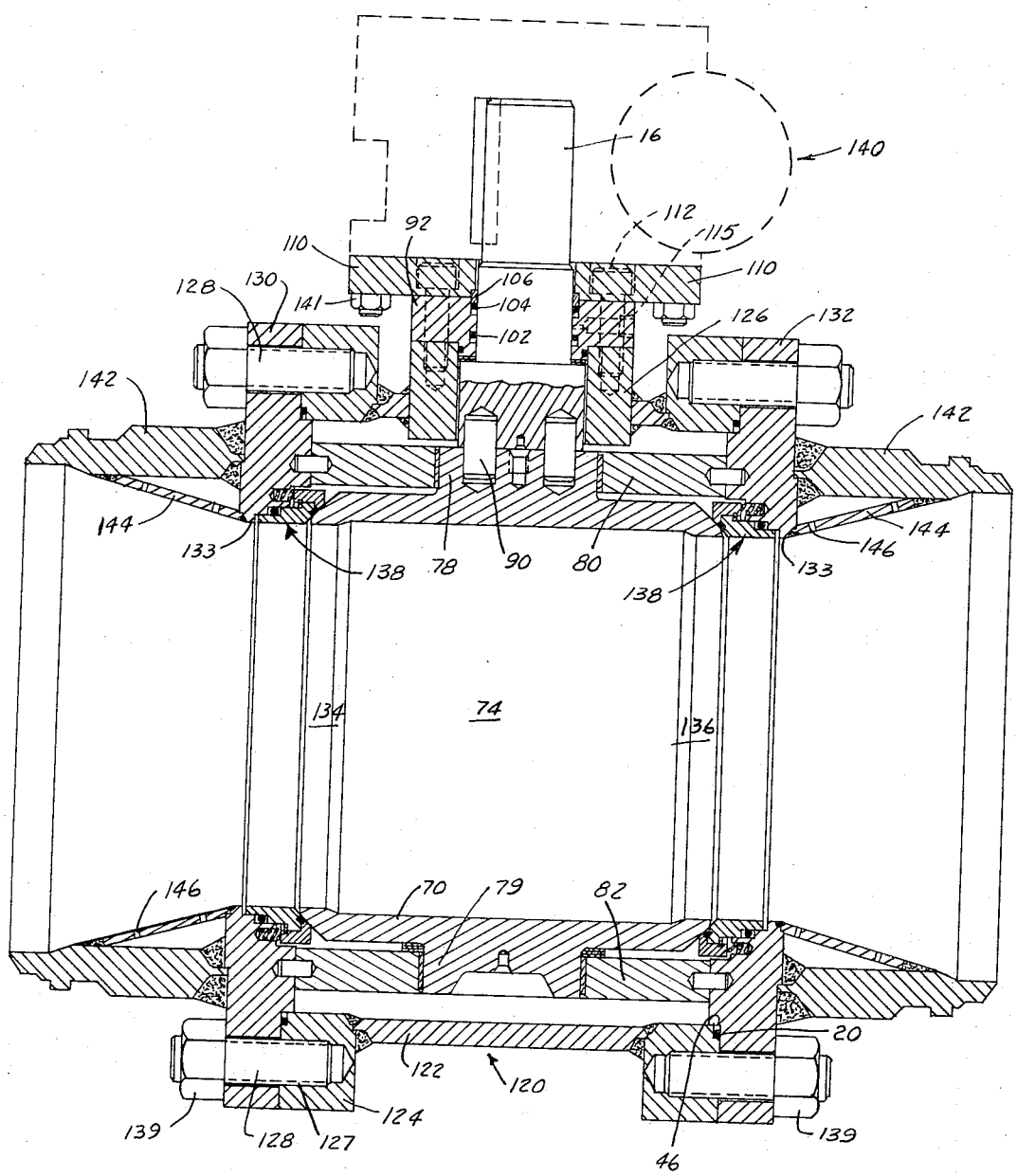

Oct. 24, 1967  J. E. PICCARDO  3,348,804
VALVE CONSTRUCTION
Filed June 10, 1964  6 Sheets-Sheet 5
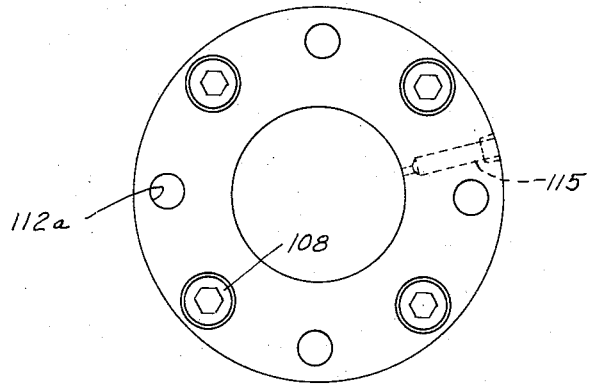
FIG-8-
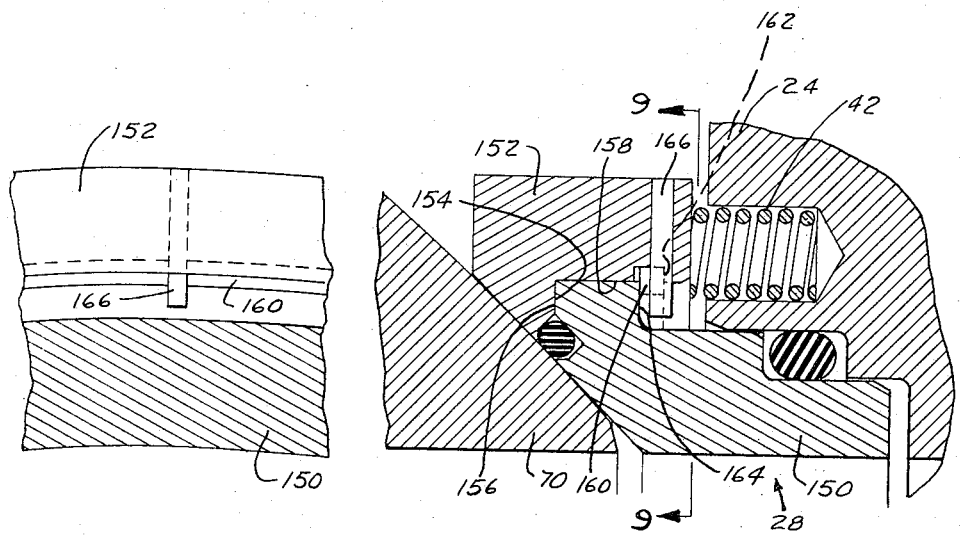
FIG-9-  FIG-10-
INVENTOR.
JACK E. PICCARDO
BY Edward B. Gregg
ATTORNEY Oct. 24, 1967  J. E. PICCARDO  3,348,804
VALVE CONSTRUCTION Filed June 10, 1964  6 Sheets-Sheet 6

INVENTOR.
JACK E. PICCARDO
BY Edward B. Gregg
ATTORNEY

United States Patent Office 3,348,804
Patented Oct. 24, 1967

3,348,804
VALVE CONSTRUCTION
Jack E. Piccardo, Oakland, Calif., assignor to Grove Valve and Regulator Company, Oakland, Calif., a corporation of California
Filed June 10, 1964, Ser. No. 373,922
9 Claims. (Cl. 251—214)

This invention relates to a valve construction and, more particularly, to a rotatable valve structure wherein the valve body is fabricated from standard structural materials and the valve element is rotatably mounted in bearing blocks that are separately formed and removably secured in place within the valve body.

Valve bodies that are conventionally provided for ball valves, plug valves or the like are of cast metal with machine finished surfaces, particularly where it is desired to achieve a seal with complementary surfaces. When the valves for which such valve bodies are provided are of fairly large size, as for example valves for use in pipeline transmission, the cast bodies become extremely heavy and unwieldy and, therefore, difficult to handle during such finishing operations. Moreover, because of the costs of preparing molds for such castings and the problems incurred in stocking a wide variety of valve bodies or the molds from which they are cast, the manufacturer is quite restricted in the models and types of valves that can be produced in a particular size and pressure rating. For example, a 12 inch ball valve is generally produced with 12 inch flange or weld hubs and it is not economical from a commercial standpoint to provide a variety of molds for casting valves with reduced or enlarged discharge hubs, although it is frequently desirable that such be provided for a particular pipeline installation. That is, in many installation a 12 inch ball valve would work adequately in a 14 or 16 inch pipeline but, because the connections in the pre-cast body and hubs are peculiarly adapted for connection to a 12 inch pipeline such substitution cannot be made.

It is, therefore, an object of this invention to manufacture a valve from a plurality of relatively small standard structural members that may be cut, formed and finished separately and thus easily handled before assembly.

It is a further object of this invention to provide a rotatable valve structure formed primarily from plate material.

It is a further object of this invention to provide a valve body structure formed of a number of separate components each separately produced from standard materials and assembled in any one of a variety of ways.

It is a further object of this invention to provide a valve body member having end walls made of plate material to which may be welded hubs of selected diameters.

It is a further object of this invention to provide a valve body that may be prefabricated with tubular hubs adapted for connection into a pipeline of a diameter larger than that of the valve bore.

Frequently when valves are installed in pipelines or the like, they are buried in the ground or otherwise located in positions or sites of a relatively inaccessible nature. Consequently, should there be a failure of the stem seal immediate repairs are often impossible. In any event, such repair and replacement of stem or bonnet seals frequently require that the valve be removed from the pipeline and completely dismantled for access to the stem seals.

It is, therefore, a further object of this invention to provide primary and secondary stem seals, together with means for detecting failure of the primary seal.

It is a further object of this invention to provide stem seals that may be replaced with minimum interruption of normal pipeline operation.

The rotatable element of this invention is housed within a body that is prefabricated from a plurality of standard structural forms. For example, the main body member is formed essentially from a plate that is rolled into a split ring configuration with a mounting block welded between the free ends for support of the valve bonnet and operator. Similarly the hubs are formed from plate material which is rolled into tubular configuration, either cylindrical or tapering, with the outer end adapted for flange or weld connections to a pipeline. These hubs of selected diameters are welded onto the end walls or closure flanges, similarly formed of plate material. Prior to assembly of the valve the closure flanges are bored to provide a flow passage and counter-bored to provide one or more recesses for the accommodation of the valve sealing assembly.

The rotatable member, the valve ball, is provided with co-axial, oppositely extending trunnions that preferably lie within the spherical radius of the ball. By so limiting the over all dimension of the ball, it may be accommodated within a valve body of minimum size, thus reducing the manufacturing costs. A pair of bearing blocks formed from plate material, are of a configuration so that when placed over the trunnions the ball and bearing blocks may be inserted as a unit through the side of the main body ring. The body closure flanges are drawn together by suitable bolt means to clamp the bearing blocks firmly between them and to bring the flange faces into sealing engagement with resilient seal rings disposed between the flanges and the annular faces of the main body ring to render the body fluid tight. Any tendency of the end walls to bend outward under internal pressure will have little affect on the tight clamping engagement of the bearing blocks and, because the walls tend to fulcrum about the bearing blocks, the outer edges will tend to deflect inward into tighter sealing engagement with the main body ring seal.

When the ball with bearing blocks in place are clamped within the valve body, a valve operating stem may be inserted through an opening in the mounting block insert of the main body ring, and coupling members which extend axially from the bottom of the stem are engaged with complementary coupling means in one of the trunnions. Then, a bonnet or gland plate with a central opening in which are carried a pair of O-ring seals is lowered over the shaft and bolted onto the top of the mounting block. A small warning duct is provided through the bonnet between the O-ring seals to the atmosphere so that the presence of fluid leaking through the duct will indicate positively that there is a failure in the lower O-ring seal. In such case, the duct can be plugged and sealing thereafter effected by the upper O-ring seal until the replacement can be made.

Other objects and advantages of this invention will become apparent from the description following when read in conjunction with the accompanying drawings wherein:

FIG. 2 is a section view taken along line 2—2 of FIG. 1;

FIG. 3 is a top view of the valve bonnet assembly;

FIG. 4 is a horizontal section view taken along line 4—4 of FIG. 1;

FIGS. 5 and 6 are enlarged partial section views of a valve body seal structure;

FIG. 7 is a vertical section view of another embodiment of this invention;

FIG. 8 is a top view of a gland plate mounting;

FIGS. 9 and 10 are enlarged partial section views of the main seal assembly for the valve;

Figure 1:
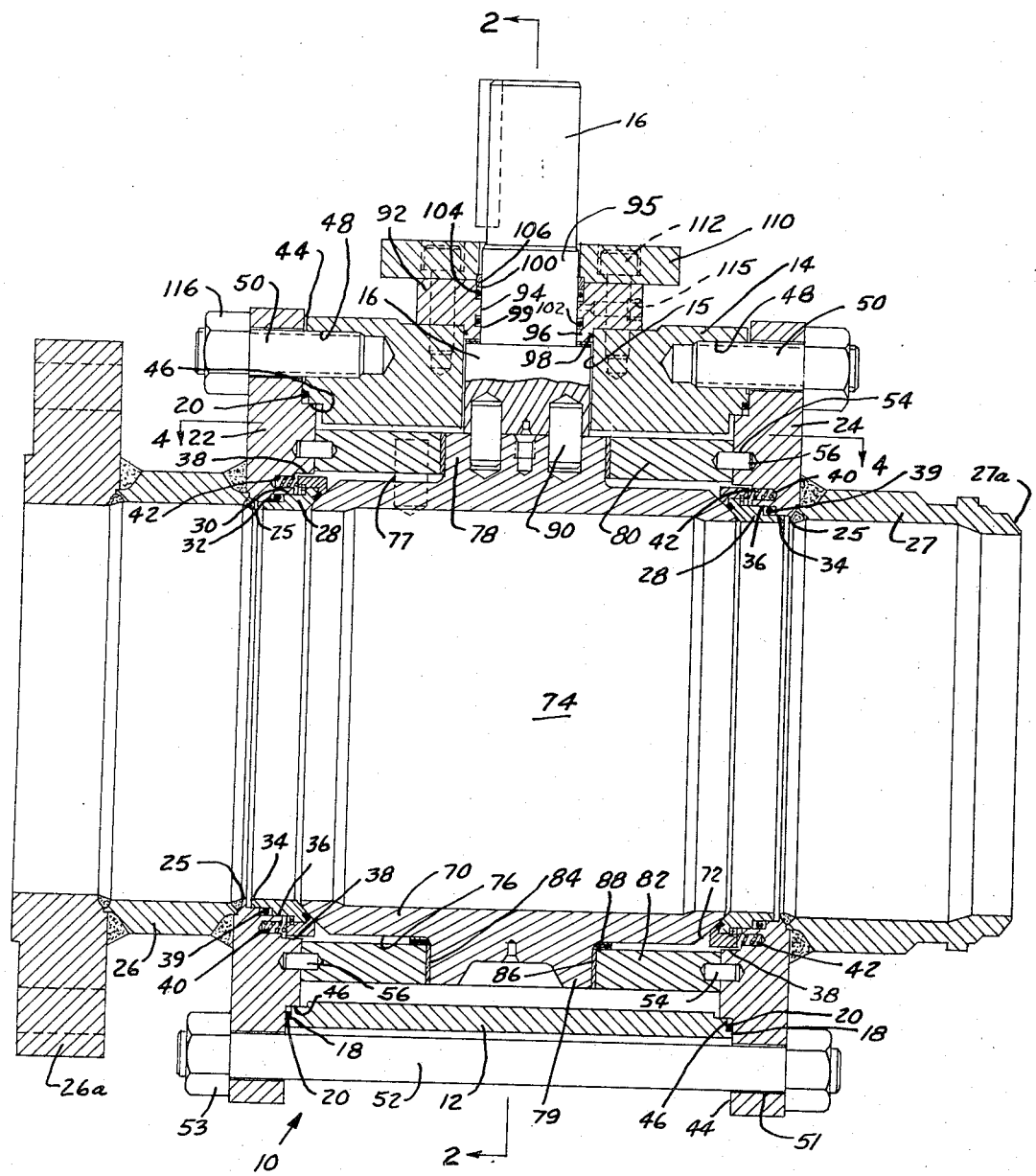
FIG. 1 is a section view of a valve embodying features of this invention.

Referring now to the drawings in greater particularity, and specifically to FIGS. 1 and 2, the ball valve 10 there shown includes a main body ring 12 of cylindrical, tubular configuration formed primarily from plate material of relatively thin wall section which is rolled into a split ring configuration. As will be noted in FIG. 2, a relatively thicker mounting block 14 which is bored at 15 to accommodate a valve operator shaft or stem 16, is interposed and welded into the gap of the split thin-walled ring 12 to provide a fluid-tight continuous walled cylindrical member. Prior to assembly, the main body ring 12, 14 is bored out to provide recesses 18 around the annular faces thereof to accommodate a resilient seal ring 20.

Also forming a part of the valve body member are end or closure flanges 22 and 24 which are formed of plate steel or the like. The end walls may be of generally circular configuration as shown and, prior to assembly, are bored, at 25 to form inlet and outet flow passages. Then, suitable tubular hubs 26 and 27 are welded onto the outer faces of the end walls of closure flanges 22 and 24 for connection to a pipeline by suitable means such as a line flange 26a or a chamfer end 27a for a weld joint. Once the hubs 26 and 27 are welded onto the end walls 22 and 24, the end walls are then counter-bored to form recesses in the inner surfaces for accommodation of the valve seat ring assembly 28. In the valve illustrated, the seat is provided with stepped shoulders 30 and 32 and, therefore, the end walls are counter-bored at 34 and 36 and in this case at 38 to accommodate the entire seat ring with an O-ring 39 sealing between the bore 36 and the step 32. Additionally, a series of small bores 40 are formed around each seat ring recess in order to accommodate a series of small helical springs 42 which act against the seat ring assembly 28 to urge it into sealing contact.

Additionally, before further assembly, the inner face of each closure or end wall 22 and 24 is cut down somewhat at 44 adjacent its outer edge to provide a shoulder 46 for accommodation of the main body ring 12–14, and the O-ring seal 20. Finally, holes 48 are drilled and tapped in the mounting block 14 for accommodation of studs 50 and additional holes 51 are bored around the end walls 22 and 24 to receive the studs 50 as well as a series of through studs 52 which receive nuts 53. In addition, position holes 54 are provided in the end walls to accommodate bearing block position pins 56 hereinafter to be described.

It will be noted that all of the foregoing finishing operations on the closures are completed before assembly and while the plate material is easily handled in conventional machine tools without requiring special jigs, unwieldy hoists or the like.

In the meantime, the valve ball 70 is formed with a spherical surface 72 of a diameter slightly less than that of the main body ring 12, 14 (FIG. 2). The surface 72 is adapted to cooperate with the seat rings 28 to seal against fluid flow when the valve is turned to a position wherein it is 90 degrees from that shown in FIG. 1 so that the central bore flow passageway 74 is disposed transverse to the flow passages 26 and 27. The valve ball is cast or otherwise formed with generally flat annular surfaces 76 at the top and bottom thereof in order to form short, coaxial trunions 78 and 79 without adding to the height of the ball. Preferably the trunnions are formed within the volume of the sphere corresponding to a spherical radius which generates the surface 72. Thus the ball 70 with the trunnions 78 and 79 inherently fit within the main body ring 12, 14. The trunnions 78 and 79 are rotatably carried on a pair of bearing blocks 80 and 82 which are separately cut from plate material and bored at 84 to accommodate the trunnions. A stop pin 77 extending upward from the top flat surface 76 cooperates with complementary notches 85 formed in the upper bearing block 80 (FIG. 4) to limit rotation of the ball 70 and define the fully open and fully closed positions thereof. Suitable rotary and thrust bearing members 86 and 88 may be provided to minimize friction during rotation. The bearing blocks are also provided with position pins 56 which protrude from opposite sides thereof to be received in the accommodating position holes 54 in the end walls 22 and 24. It will be noted in FIG. 2 that the sides of the bearing blocks are cut away at 84 to follow the curvature of the ball 70 so that, with the bearing blocks 80 and 82 in place on the trunnions 78 and 79, the clearance within the body ring 12, 14 is maintained (FIG. 2). Hence, the ball and the bearing blocks together may be inserted or removed from either end of the main body ring 12–14 with one of the end closures 22 or 24 removed. The operator stem or shaft 16 is formed of a lower diameter to be rotatably received in the mounting block 14 and is provided with a pair of pins 90 that are received in complementary holes 91 in the upper trunnion 78 so that rotation of the shaft is transmitted to the trunnion and, hence, to the valve ball 70 itself.

Since the stop pin 77 and the notches 85 define the extremities of ball movement in opposite directions, the two operating positions of the valve can be determined without regard to the amount of rotation actually applied to the operating shaft 16. This is particularly important in pipeline installation wherein the pipe and, of course, the valve 10 are buried below the surface of the earth. In such instances a shaft extension (not shown) may be connected to the operating shaft 16 so that the valve may be operated from a remote position convenient for the operator. Consequently, if the operator relied upon indicator means located at the hand wheel, he may be misled in that movement indicated at the remote operating point may exceed the actual movement of the valve ball because of twisting of the extension shaft. Thus, the only accurate indication of the desired 90 degree movement is at the valve ball itself.

Sealing of the stem is accomplished by means of another separate part, a gland plate or bonnet 92 which is centrally bored at 94 to accommodate the operator shaft 16. The operator shaft is preferably formed with a reduced diameter portion 95 received within the gland plate which, in turn, is provided with an axial extension 96 that fits within the bore of the mounting block and is sealed therewith at 98. The gland plate 92 is provided with annular recesses 99 and 100 in its internal surface which accommodate seal rings 102 and 104. It will be noted that the upper recess 100 comprises simply an enlarged counter bore, the upper end of which is closed by a suitable retainer ring 106. The gland plate or bonnet 92 is secured on the mounting block 14 as by cap screws 108 (FIGS. 2 and 3), and an adaptor plate 110 which is centrally bored at 111 to accommodate the shaft 16, holds the retainer ring in place and provides a mounting for a suitable valve operator (not shown), the adaptor plate being secured by means of cap screws 112 which extend through the gland plate 92 and are threaded into the mounting block 14 (FIG. 1).

In the assembly of the valve shown in FIGS. 1 and 2, one of the end closures, say 22 is preferably supported on the flange 26a of its hub 26 so that its inner surface is uppermost and horizontally disposed. With the flange so disposed, the coil springs 42, the body seal O-ring 20 and the seat ring assembly 28 with main seal O-ring 39 may be placed and retained in their accommodating recesses. Then, the bearing blocks 80 and 82 are placed over the short trunnions 78 and 79 and the ball 70 and bearing block assembly is lowered onto the end closure 22 until the pins 56 position them properly. Next, the body ring 12, 14 is lowered over the ball and bearing block assembly to fit over the annular shoulder 46 with the studs 50 accommodated in the end plate holes 48. Of course, the main body ring could be placed before the ball and bearing block assembly but the ball assembly is easier handled and the bearing block pins 56 more readily located without blind manipulation in a confined space.

With the body ring 12, 14, and ball assembly so placed, the second end closure 24 is provided with the springs 42, the O-ring 39 and seat ring 28 and, after the outside O-ring seal 20 is placed on the shoulder 46, the end plate is lowered over the projecting studs 50 and engaged in the projecting position pins 56.

Next, a series of elongated studs 52 are extended between the end closures 22 and 24 and the nuts 53 on the long studs, as well as the nuts 116 on the short protruding studs are tightened to draw the end plates 22 and 24 toward the main body ring 12, 14 until they clamp the valve ball bearing blocks 80 and 82 firmly between them to hold them tightly against vibration under fluid pressure. This is accomplished because the bearing blocks 80 and 82 are slightly longer than the main body ring 12, 14 so that, as shown more clearly in FIG. 5, there is a slight clearance between the end walls and the main body ring when the bearing blocks 80 and 82 are clamped. However, the end plates are brought into firm engagement with the resilient seal 20 to form a complete fluid-tight connection around the body ring. Besides clamping the bearing blocks 80 and 82, the through studs 52 act as reinforcement members to limit distortion of the main body ring.

It will be noted from FIGS. 5 and 6 that the slight clearance between the end walls 22 and 24 and the annular end faces of the main body ring 12, 14 permit limited bending of the outer edges of the end walls. Thus, with the end walls tightly clamping the bearing blocks, any outward bending of the end walls under internal pressure will simply fulcrum them about the bearing blocks 80 and 82 without affecting the clamping engagement. This action actually increases the sealing pressure because the outer edges of the plates engage the resilient seal more firmly.

Finally, in assembly, the operator shaft 16 is inserted through the bore 15 of the mounting block 14 until the coupling pins 90 engage in sockets 91. Then, the gland plate or bonnet 92, with O-rings 102 and 104 and retainer ring 106 in place, is dropped into place and secured by cap screws 108. Finally, the adaptor plate 110 having tapped holes 113 for mounting a valve operator (not shown) is mounted by means of cap screws 112 that extend into the mounting block 14.

It will be noted in FIGS. 1 and 3 that there is a small duct 115 extending radially to the atmosphere through the gland plate from the bore 94 at a location between the O-ring seals 102 and 104. This duct provides a means for detecting leakage past the lower seal 102 so that, when leaking fluid is observed the duct 115 may be plugged and repairs thereafter effected at a more convenient time. In the meantime continued sealing is accomplished by the upper ring 104.

It will be noted, particularly in FIGS. 2 and 3 that the cap screws 108 secure the gland plate in place even though the adaptor plate 110 is removed. Therefore, access may be had to the upper O-ring 104 without interrupting the operation of the valve 10, simply by removing the adaptor plate and retainer ring 106 to change the upper O-ring 104. In the event that it is desired to change the lower O-ring 102, this may be done without removing the valve ball or dismantling the valve body, other than to remove the adaptor plate 110 and the gland plate 92. In such case, with the ball in the closed position, the valve body cavity is first vented and drained through suitable outlets 117, 118 to relieve the body pressure so that the gland and adaptor plates may be removed safely. After the O-rings 102 and 104 have been replaced the gland plate and adaptor plate are again mounted as shown.

In the embodiment shown in FIG. 7, the main body ring 120 is formed from a complete ring of relatively thin plate rolled to cylindrical form, or from a pipe section 122 to the ends of which are welded flange rings 124. Then, the main body ring 122 is bored to accommodate the mounting block 126 which, in turn, receives the operator shaft 16 as in the first embodiment. After the flange rings 124 are welded around the annular ends of the main body ring they are drilled and tapped at 127 to accommodate body studs 128 for attachment to the end plates 130 and 132.

As in the first embodiment, the end closures are bored at 133 to conform to the flow passages 134 and 136 and are counter-bored to form recesses for accommodation of the sealing seat ring assemblies 138. However, the means for clamping the end walls against the bearing blocks 80 and 82 differs in that after the O rings 20 are placed around the shoulders 46 of the closure walls 130 and 132, the end closures are placed over the extending studs 128 and the nuts 139 are tightened to draw the end walls toward the flange rings 124 until the bearing blocks 80 and 82 are tightly clamped between them while compressing the seal rings 20 against the flange rings. As in the first embodiment, the gland plate or bonnet 92 is placed over the valve operator shaft 16 and covered by an adaptor plate 110 which locks the whole assembly in place by tightening of suitable cap screws 112. Because the cap screws are recessed in counter bores, the top surface of the adaptor plate 110 is free for accommodation of a suitable valve operator 140 shown in phantom which is secured in place by means of upwardly extending bolts 141 outside the circle of the cap screws 112.

The valve bodies of either FIG. 1 or FIG. 7 may be adapted for installation in pipelines of various diameters simply by selecting a tubular hub to fit the particular pipeline connection even though the valve is of a smaller size. Thus, as shown in FIG. 7, the hubs 142 are of a larger diameter than the diameter of the valve ball flow passage bores 133. This may be accomplished by flaring the hub itself, or as shown in FIG. 7, by providing a generally cylindrical hub 142 and welding thereto a frusto-conical liner 144 which is also welded to the end wall to provide a smooth transition from the internal flow passage 133 to the larger diameter of the hub 142. A series of perforations 146 are provided in the liner 144 to equalize pressures on both sides of the liner and, hence, to nullify the effects thereof. Thus, the hubs provide a standard face to face dimension and outer diameter for connection to a larger pipeline than that for which a conventional ball valve of the same size would be employed. This is possible because the hubs 142, the flaring liners 144 and the end plates 130 and 132 may all be manufactured and stored separately to be assembled and welded together in accordance with customers' demands.

Thus, for example, 14-inch hubs may be used with a 14-inch valve body, or they may be fitted with liners 144 and used in a 12-inch valve, as long as the smaller valve meets the pipeline requirements. Again, the hubs 142 could themselves diverge into a larger diameter but the structure shown has certain advantages in addition to the desired flexibility. That is, the generally cylindrical hub 142 is closer to the circle of studs than a hub of frusto-conical configuration and, hence, there is less area exposed to unbalanced internal pressure. Therefore, the structure of FIG. 7 is stronger.

Referring now to FIGS. 9 and 10 there is shown an enlarged section view of the seat ring 28 forming a part of this invention. Particularly for ease in manufacturing, the seat ring is formed in two parts, an inner seat ring 150 and an outer seat ring 152. The outer seat ring is formed with an annular surface 154 forming a shoulder which accommodates a complementary annular face 156 of the inner seat ring which is of an outer diameter to fit within the bore 158 of the outer seat ring. When the inner seat ring has been inserted, a split ring 160 is snapped into an accommodating radial recess forming a shoulder 162 so that the ring 160 acts between shoulder 162 on the outer seat ring and radial surface 164 of the inner seat ring to prevent separation of the rings. The split ring itself is secured against inadvertent removal by means of a pin 166 or the like which is driven into an accommodating opening in the outer seat ring and between the ends of the split ring 160 to prevent them from coming close enough together to reduce the diameter of the seat ring enough for removal. Because I have eliminated the need for screws to hold the seat ring components 150 and 152 together, the necessary cross sections are achieved with smaller outside dimensions which may, in turn, permit use of a smaller body ring. This, with the resultant ease of assembly, produces a substantial savings in manufacturing costs.

Figure 11:
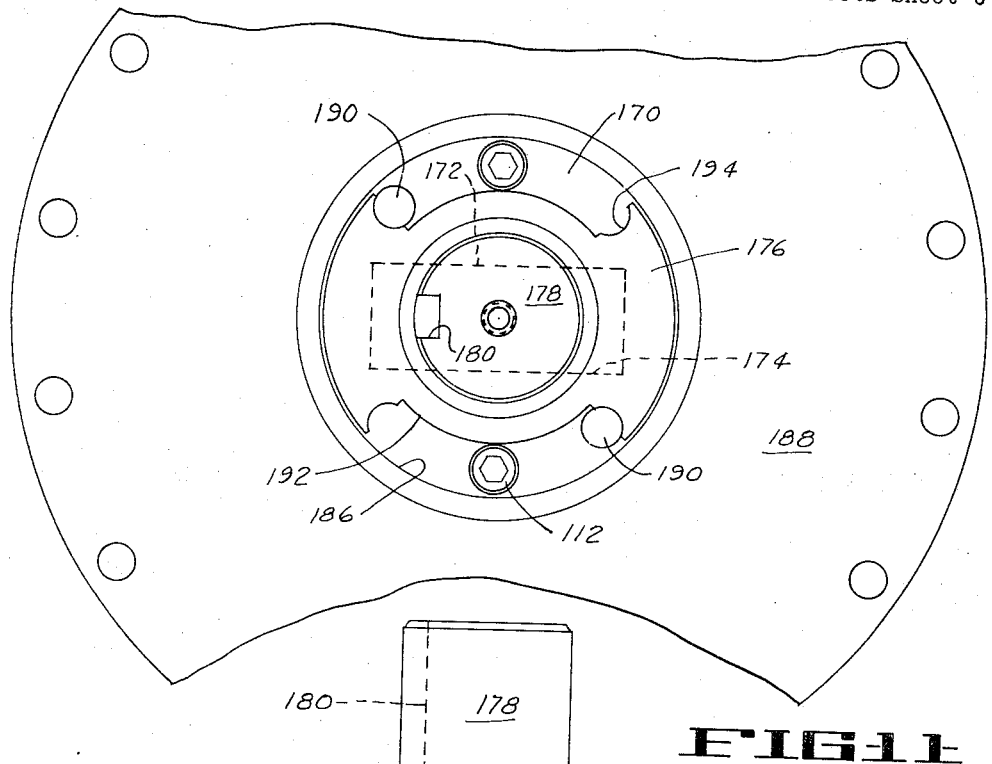
FIG. 11 is a partial top view of a valve bonnet assembly.
Figure 12:
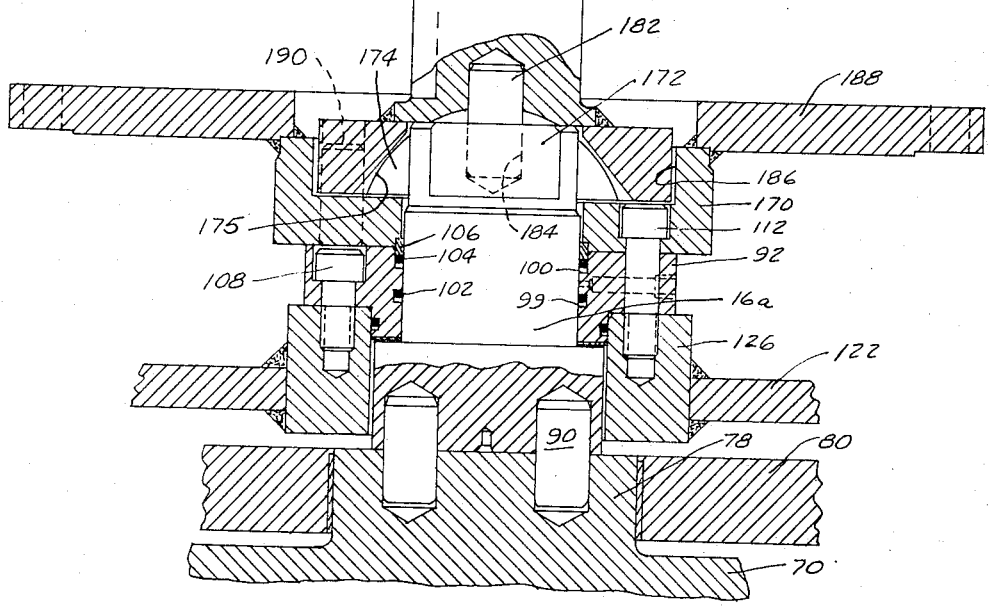
FIG. 12 is a vertical section view of the valve bonnet structure of FIG. 11.

Referring now to FIGS. 11 and 12, I have shown a modified form of adaptor block 170 which is particularly adapted for use wherein a valve shaft extension is employed and it is desired positively to define the open and closed positions of the valve. As there shown, the upper end of the valve operating stem or shaft 16a is provided with flattened chordal faces 172 on diametrically opposite sides that are cooperatively engaged with complementary parallel internal surfaces 174 that are formed by milling out a coupling socket 175 from a coupling plate 176 carried on the lower end of a shaft portion 178 having a key way 180 adapting it for connection to a shaft extension (not shown). Thus, rotation of the shaft coupler 176 produces rotation of the valve operating shaft 16a by engagement of the chordal sides 172 within the slot 175. Lateral movement of the coupler shaft parallel to the chordal surfaces is prevented by engagement of a locating pin 182 in a central socket in the operator shaft 16a. Additionally, the coupling block 176 may be received within a bored recess 186 formed in the adaptor block 170. Welded to the upper end of the adaptor block is a mounting plate 188 for attachment of a suitable actuator or a shaft extension (not shown) for remote operation.

Protruding upward from the bottom surface of the bored receptacle 186 within the adaptor block is a pair of stop pins 190 and, as shown in FIG. 11, the coupling block is cut away at diametrically opposite sides to form arcuate recesses 192 of smaller diameter terminating at opposite ends in socket-like stop surfaces 194 which limit the turning movement of the coupling block 176 and, hence, that of the valve ball 70. Thus, when the coupler shaft 178 is rotated, the operator shaft 16a is turned to carry the adaptor block 176 along the stop pins 190 to the extent permitted by the arcuate recesses 192 and until the pins engage in the opposite stop surfaces 194 which define a 90-degree rotation of the ball between open and closed positions of the valve. In this way, the two operative positions of the valve ball are positively determined without guess work or resort to visual indicator means that may not reflect torque that is absorbed in an elongated stem extension.

While this invention has been described in conjunction with preferred embodiments thereof, it is to be understood that modifications and changes therein may be made by those skilled in the art without departing from the spirit and scope of the invention defined by the claims appended hereto.

Having described my invention, I claim:
1. A rotatable valve structure comprising:
a generally circular tubular main body ring,
a pair of opposing, generally parallel plate-like end walls extending across the circular ends of said body ring,
an annular seal member sealing between each annular end of said body ring and one of said end walls,
a plurality of threaded members around said end walls drawing the edges thereof into engagement with said annular seal member,
means forming flow passages through said end walls,
a rotatable valve member completely contained within said body ring,
a pair of trunnions extending from said valve member,
a pair of bearing blocks rotatably receiving said trunnions,
said bearing blocks and said valve member being removable as a unit through an end of said body ring when an end wall is removed therefrom,
the axial length of said body ring being shorter than the axial lengths of said bearing blocks so that said threaded members clamp said bearing blocks between said end walls,
means forming a shaft opening radially through said body ring,
a valve operator shaft rotatably received in said opening,
coupling means connecting said shaft to one of said trunnions to transmit rotational movement to said valve member,
an annular recess formed in the inner surface of each of said end walls around the flow passage formed therein, and
an annular seal member carried in said recess in sealing engagement with said valve member.
2. The rotatable valve structure defined by claim 1 wherein:
said body ring comprises a relatively thin-walled tubular main body portion and a pair of flange rings welded around the annular ends of said main body portion,
and each of said threaded members comprises:
a screw slidably received through one of said end walls and threadedly received in one of said flange rings.
3. The rotatable valve structure defined by claim 1 wherein said body ring comprises:
a relatively thin-walled tubular member and said threaded members comprise:
a plurality of bolts extending through said end walls to hold said end walls against the annular seal member around said body ring.
4. The rotatable valve structure defined by claim 1 including:
a relatively thick body block interposed in said body ring,
means in said body block forming said shaft opening,
a gland plate mounted on said body block with a through bore therein receiving said operator shaft,
at least one recess formed in said gland plate around said circular bore, and
a resilient seal caried in each said recess to seal between said gland plate and said operator shaft.
5. The rotatable valve structure defined by claim 1 including:
first and second tubular hubs welded to the outside of said end walls around said flow passages, and
means on the outer end of each of said hubs adapting it for connection to the annular end of a pipeline section,
at least one of said hubs comprising:
an outer tubular pipe having an annular inner end adjacent the end wall to which it is welded of an internal diameter larger than the flow opening and an external surface adjacent said threaded members,
a relatively thinner inner tubular liner within said pipe,
the annular inner ends of said pipe and liner being in radial spaced relationship, and
the annular outer ends of said pipe and liner being in converging nested relationship.
6. The rotatable valve structure defined by claim 5 wherein said one hub comprises:
a cylindrical pipe of said larger internal diameter, and
a frusto-conical tubular liner within said pipe welded at its inner end to said end plate to form a continuation of said flow passage and welded at its outer end to said pipe.

7. A rotatable valve structure comprising:
a rotatable valve member,
a pair of bearing blocks rotatably receiving said valve member,
a pair of end walls of plate material,
means engaged around the edges of said end walls drawing said edges toward each other to clamp said bearing blocks between said end walls, and
a body ring completely containing said valve member, embracing said bearing blocks and enclosing the space between said end walls,
said body ring being slightly narrower than said bearing blocks, and
a resilient seal around the edges of said body ring,
said drawing means pulling the edges of said end walls toward each other into engagement with said resilient seal.

8. A valve housing comprising:
a tubular, cylindrical body band;
a valve closure member rotatably mounted in said body band about an axis normal to the axis thereof and completely contained therein,
a pair of end walls having flow openings therethrough,
bolt means around said end walls securing said body band between said end walls,
means around said body band sealing between said body band and each of said end walls,
a seal ring carried on at least one of said end walls for axial movement into sealing engagement with said valve closure member, and
a tubular hub secured to the outside of one of said end walls around the flow opening therethrough;
said hub comprising:
an outer tubular pipe having an annular inner end adjacent said one end wall of a diameter to fit closely within said bolt means, and
an inner tubular liner within said pipe,
the annular inner ends of said pipe and liner being in radially spaced relationship, and
the annular outer ends of said pipe and liner being in converging nested relationship.

9. A valve housing comprising:
a tubular body band,
a resilient seal around said body band,
a pair of opposing, plate-like end walls having flow openings therethrough,
screw means on a bolt circle securing said end walls to said body band into sealing engagement with said seal, and
first and second tubular hubs welded to the outside of said end walls around said flow openings,
at least one of said hubs comprising:
a cylindrical pipe of an internal diameter larger than the flow opening in an end wall and an outer diameter slightly smaller than said bolt circle welded to said end wall, and
a relatively thinner, frusto-conical tubular liner within said pipe welded at its inner end to said end wall to form a continuation of said flow opening and welded at its outer end to said pipe.

References Cited

UNITED STATES PATENTS

| | | | |
|---|---|---|---|
| 1,832,725 | 11/1931 | Mueller | 251—287 |
| 3,083,945 | 4/1963 | Shafer et al. | 251—317 X |
| 3,109,623 | 11/1963 | Bryant | 251—315 X |
| 3,151,837 | 10/1964 | Leek | 251—214 |

FOREIGN PATENTS 915,883  7/1954  Germany.

WILLIAM F. O'DEA, *Primary Examiner.*

D. R. MATTHEWS, *Assistant Examiner.*